Figure 1:
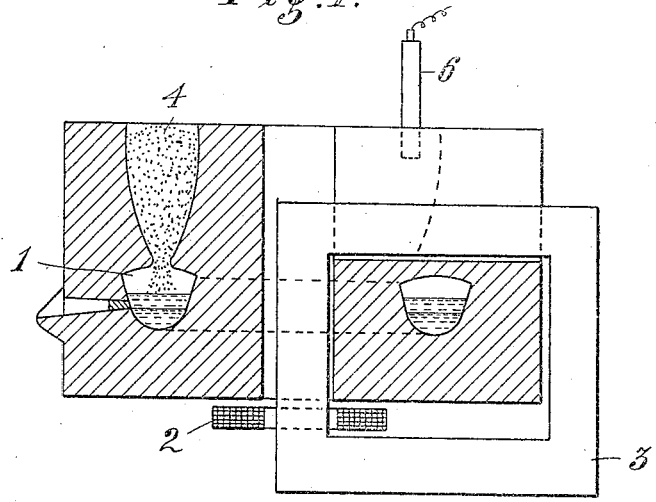

O. FRICK.
METHOD OF REDUCING AND MELTING OXIDS AND THE LIKE.
APPLICATION FILED APR. 19, 1907.

932,459.

Patented Aug. 31, 1909.

Witnesses

Emil Waheberg
August Sorensen

Inventor
Otto Frick

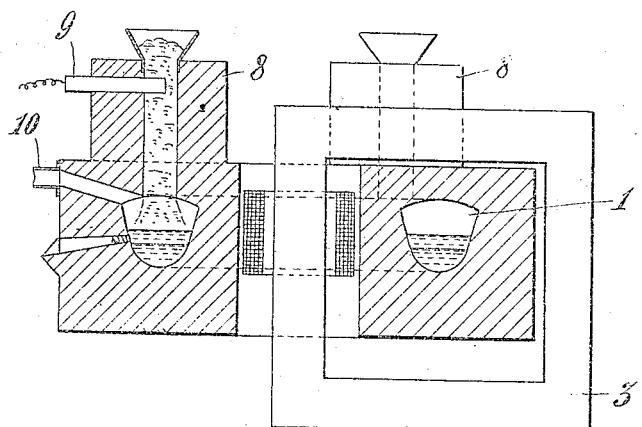
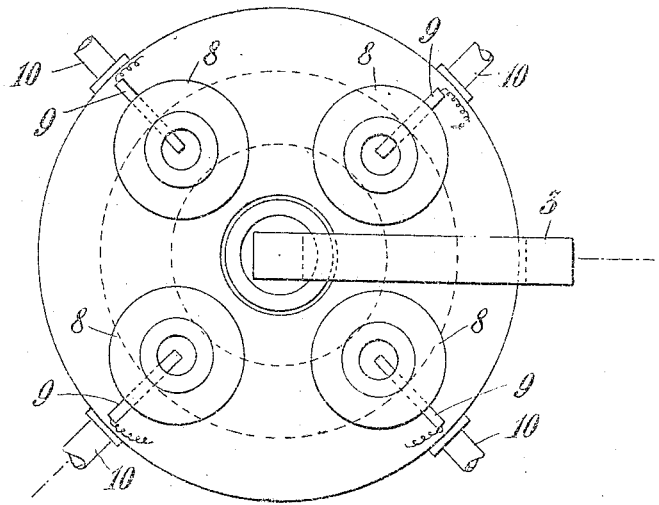

O. FRICK.
METHOD OF REDUCING AND MELTING OXIDS AND THE LIKE.
APPLICATION FILED APR. 19, 1907.

932,459.

Patented Aug. 31, 1909.
4 SHEETS—SHEET 4.

Witnesses

Inventor
Otto Frick

UNITED STATES PATENT OFFICE.

OTTO FRICK, OF SHEFFIELD, ENGLAND.

METHOD OF REDUCING AND MELTING OXIDS AND THE LIKE.

932,459.

Specification of Letters Patent. Patented Aug. 31, 1909.

Application filed April 12, 1907. Serial No. 369,078.

*To all whom it may concern:*

Be it known that I, OTTO FRICK, a subject of the King of Sweden, and resident of Sheffield, in the Kingdom of Great Britain, have invented new and useful Improvements in Methods of Reducing and Melting Oxids and the Like, of which the following is a specification, reference being had to the drawings accompanying and forming a part hereof.

In electric furnaces for reducing and melting oxids etc. it appears that the electric conductivity of the melted product is considerably greater than that of the generally grainy raw material. It is, therefore, connected with great difficulties, or even impossible, to supply the electric energy sufficient for the melting by inducing the solid pulverous material, and it is also difficult, on account of the too small resistance of the melted product, to make use of the heat arising through the resistance of a current supplied through outer electrodes.

The object of the present invention is to provide a combined method for reducing oxids etc. and melting the reduced material in which the electric energy is supplied under conditions enabling the generating of the electric current and the supply thereof to the material to be treated in the most profitable manner.

The invention consists, chiefly, in first reducing the solid material to be treated by successively introducing it as a resistance between electrodes above an annular crucible and, secondly, melting the reduced material gradually sinking into the crucible by an electric current induced in the melted material therein.

The furnaces employed in carrying out the invention form a combination of a resistance furnace and an induction furnace in which the working chamber of the resistance furnace forms one or more shafts opening into the crucible of the induction furnace.

In the drawings, I have shown, merely diagrammatically, some embodiments of my invention.

Figure 2:
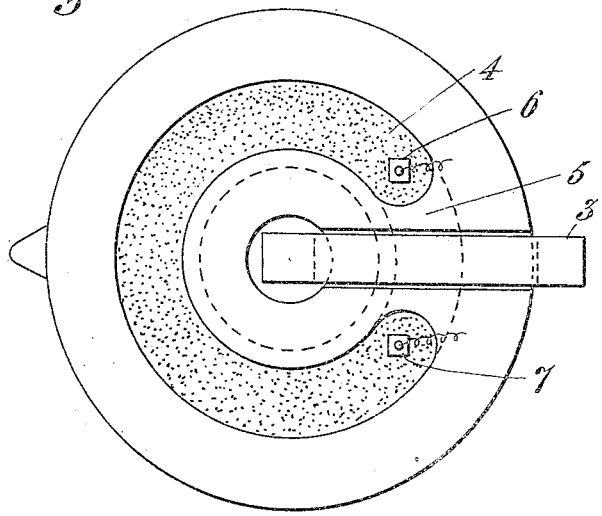
Figure 3:
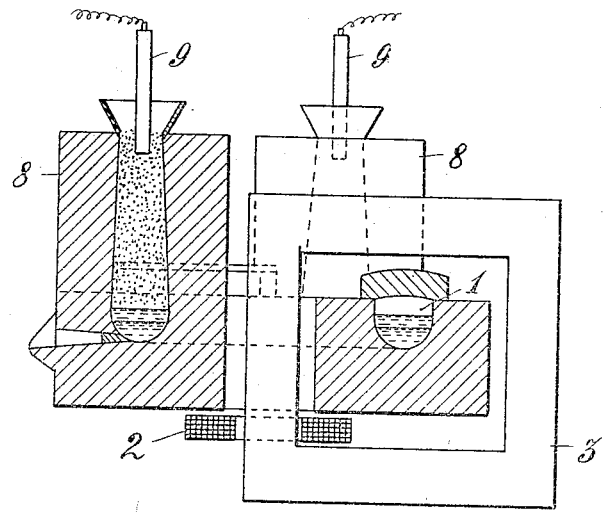
Figure 4:
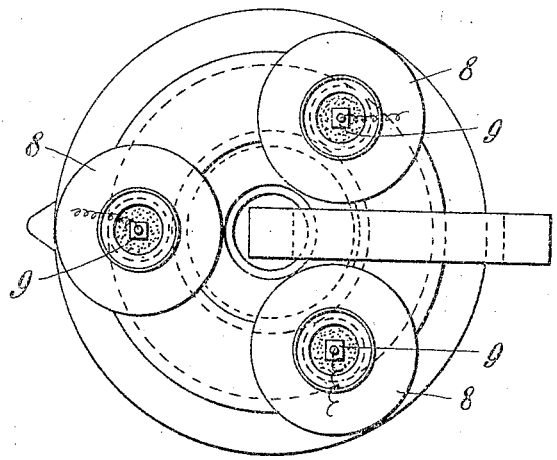
Figure 7:
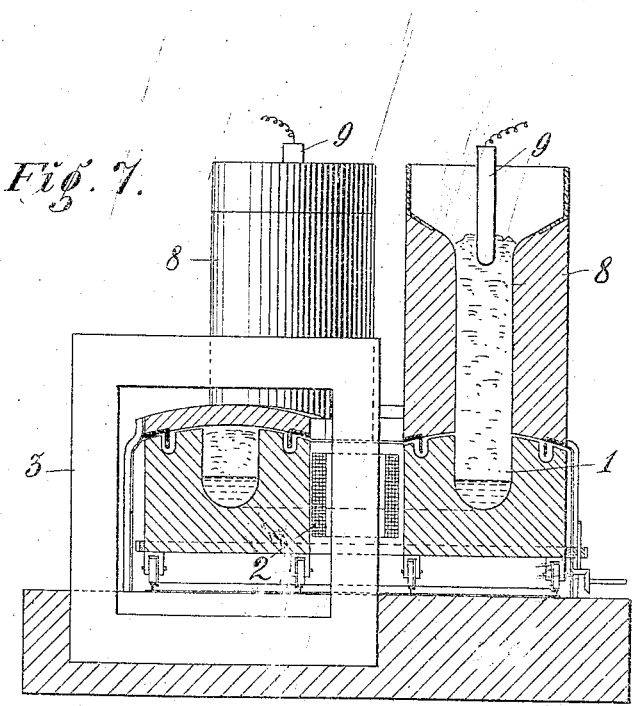
Figure 8:
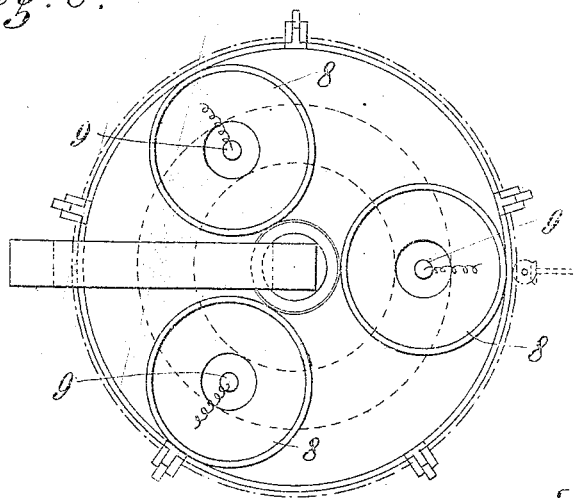

Figure 1 shows a vertical section and Fig. 2 is a plan view of a furnace in which the electrode current passes through the mixture to be reduced substantially in a horizontal direction. Figs. 3 and 4 are similar views of a modified arrangement in which the current passes in a substantially vertical direction through the material to be reduced. Figs. 5 and 6 are similar views of a third modification. Figs. 7 and 8 are similar views of a modification of the furnace shown in Figs. 3 and 4 in which the crucible and the reduction shafts are arranged in such a manner as to allow of being moved relatively to each other.

Referring to Figs. 1 and 2, the lower part of the furnace consists of an annular crucible 1 adapted to receive the melting mass, which forms a closed electric conductor in which electric currents are induced, in the manner usual in induction furnaces, by a magnetic field, the iron core 3 of which passes through the crucible and is provided with a primary coil 2. Arranged above the crucible 1 is an annular shaft 4 interrupted by a brickwork 5 at the place where the upper horizontal part of the iron core passes through the same. Placed at both sides of this brickwork are electrodes 6, 7 adapted to be connected to a suitable continuous or alternating current source. The current supplied through these electrodes flows through the material supplied to the shaft 4 in a substantially horizontal direction, and the strength of the current is so regulated that the mass is heated to its temperature of reduction. The mass thus reduced sinks into the crucible situated in the bottom of the furnace and if the said crucible contains sufficient quantity of melted metal heated by current induced therein, the said melted mass emits heat upwardly to the reduced material so as to melt it. The working proceeds continuously, and when a sufficient quantity of melted material has accumulated in the crucible, some of the melted mass is drawn off. It is to be observed, however, that such a quantity of melted mass must remain in the crucible as is required for the proper working of the transformer.

In the embodiment illustrated in Figs. 3 and 4 the transformer arrangement is essentially the same as in Figs. 1 and 2, except that for supplying the mass to be reduced three vertical shafts 8 are arranged above the crucible at an interdistance of 120°. Each shaft is provided, at its top, with an electrode 9, each electrode to be connected to one pole of a three-phase current source. The three-phase current passes through the mass in the shafts and heats the said mass to the reduction temperature, the melting mass accumulated beneath the shafts upon the bottom of the crucible serving as a short-circuit conductor and neutral point for the said currents.

The form of construction illustrated in Figs. 5 and 6 differs in constructional respects from that shown in Figs. 3 and 4 chiefly in that it is provided with four shafts 8 having electrodes 9 projecting inwardly in horizontal directions at their tops. This furnace is adapted to be supplied with current from a two-phase current source, or a single-phase alternating current source, respectively, if, in the latter case, the electrodes are connected, by pairs, to one and the same pole. Said furnace is supposed to be used for producing zinc and has to this end, at the bottom, a permanent bath of iron or other non-volatile metal serving to facilitate the heating of the slag formed in the furnace. For carrying off the zinc vapors formed tubes 10 are provided leading to suitable condensing appliances. Obviously, this furnace can also be used for producing other volatile metals than zinc.

The constructional form shown in Figs. 7 and 8 differs from that illustrated in Figs. 3 and 4 in that the crucible is arranged in such a manner as to allow of being rotated relatively to the cover and to the reduction shafts. By this means is gained that the material dropping into the crucible can be uniformly distributed over the whole length of the crucible, whereby the latter, which is, suitably, made of compressed magnesite, or the like, is uniformly worn and the heat supplied by induction is uniformly distributed all over the whole melting material.

Instead of making the crucible rotatable, the same may be arranged stationary and the cover with the shafts and the iron core be made rotatable.

It is obvious that other forms of furnaces adapted to be used for carrying out the described method might be devised. For instance, the melting bath may form more than one closed circuit, if desired, and be arranged, if desired, for the same number of phases as the current used for heating by resistance.

Having now described my invention, what I claim as new and desire to secure by Letters Patent is:

1. The method of reducing and melting oxids and the like which consists in successively introducing the solid material to be treated between electrodes in such a manner as to continually form a continuous conductor of high-resistant material between the said electrodes, reducing the said material by causing an electric current to flow through the said continuous high-resistant conductor between the electrodes, allowing the reduced material to sink into an annular crucible, and melting the reduced material by electric current induced in the melted material within the crucible, substantially as and for the purpose set forth.

2. The method of reducing and melting oxids and the like which consists in successively introducing the solid material to be treated between electrodes in such a manner as to continually form a continuous conductor of high-resistant material between the said electrodes, reducing the said material by causing an alternating electric current to flow through the said continuous high-resistant conductor between the electrodes, allowing the reduced material to sink into an annular crucible, and melting the reduced material by electric current induced in the melted material within the crucible, substantially as and for the purpose set forth.

In testimony whereof I have signed my name to this specification in the presence of two subscribing witnesses.

OTTO FRICK.

Witnesses:
LUTHER J. PARR,
CHAS. N. DANIELS.